United States Patent

Nakamura et al.

[11] Patent Number: 5,962,939
[45] Date of Patent: Oct. 5, 1999

[54] OUTER-ROTOR TYPE ENGINE-OPERATED GENERATOR

[75] Inventors: Masashi Nakamura; Motohiro Shimizu; Tadafumi Hirose, all of Wako, Japan

[73] Assignee: Honda Giken Kogyo Kabushiki Kaisha, Tokyo, Japan

[21] Appl. No.: 09/010,105

[22] Filed: Jan. 21, 1998

[30] Foreign Application Priority Data

Jan. 22, 1997 [JP] Japan ..................................... 9-009309

[51] Int. Cl.⁶ ............................ H02K 11/00; H02K 7/02; H02K 21/22; F02P 1/00
[52] U.S. Cl. .......................... 310/70 A; 310/74; 310/153; 310/156; 310/267; 123/149 D
[58] Field of Search ...................... 310/70 A, 74, 310/153, 156, 70 R, 68 B, 261, 267; 74/572; 318/830; 324/146; 336/210–213, 216–219, 233; 123/149 D, 149 A

[56] References Cited

U.S. PATENT DOCUMENTS

| | | | |
|---|---|---|---|
| 3,828,212 | 8/1974 | Harkness et al. | 310/153 |
| 4,146,806 | 3/1979 | Katsumata | 310/153 |
| 4,435,660 | 3/1984 | Willer et al. | 310/153 |
| 4,603,664 | 8/1986 | Jackson | 123/149 D |
| 4,606,323 | 8/1986 | Nash | 123/602 |
| 5,654,600 | 8/1997 | Nomura et al. | 310/68 B |

FOREIGN PATENT DOCUMENTS

| | | |
|---|---|---|
| 61-40463 | 2/1986 | Japan . |
| 646219 | 11/1994 | Japan . |

*Primary Examiner*—Thomas M. Dougherty
*Assistant Examiner*—Dang Dinh Le
*Attorney, Agent, or Firm*—Carrier, Blackman & Associates, P.C.; Joseph P. Carrier; William D. Blackman

[57] ABSTRACT

An outer-rotor type engine-operated generator is of low cost and simple construction, can be miniaturized and can leak electricity for ignition without sacrificing generator output. The engine-operated generator has a plurality of magnets arranged along an inner circumference of an outer cylindrical wall of an outer-rotor and a multipolar stator housed within the outer-rotor facing the magnets. An electricity generating section for an engine ignition device is disposed on an outside of and opposite to the outer cylindrical wall of the outer-rotor, and a through window, through which magnetic force of the magnets affects the electricity generating section, is formed in a part of the outer cylindrical wall.

15 Claims, 4 Drawing Sheets

OUTER-ROTOR TYPE ENGINE-OPERATED GENERATOR

BACKGROUND OF THE INVENTION

1. Field of the Invention

The present invention relates to an outer-rotor type engine-operated generator.

2. Description of Relevant Art

In recent years, a multipolar generator having magnets disposed on an inner circumferential surface of an outer-rotor has been used widely as an electricity generating section of a portable generator or the like which produces commercial frequency output by inverter control.

When the outer-rotor type multipolar generator is driven by an engine, the outer-rotor can be combined with a flywheel as a flywheel rotor. In this case, it is unnecessary to provide a separate flywheel in addition to the generator so that the engine-operated generator can be made small-sized in its entirety.

With such a generator, it is fairly difficult to use an ignition device to be attached outside such as a conventional self-trigger ignition device in which a magnet is attached on an outer circumference of the flywheel to extract energy for ignition.

Namely, in case of the outer-rotor type generator, because magnets for generating electricity are arranged on the inner circumferential surface of the outer-rotor, the diameter of the outer rotor can not be made small if sufficient energy is to be obtained, and therefore the outer-rotor becomes large in diameter and its circumferential velocity becomes high. If it is intended to also attach a magnet on the outer circumference of such an outer-rotor, as in Japanese Laid-Open Patent Publication No. Sho 61-40463, it is difficult to ensure a sufficient supporting strength of the outer magnet and the outer-rotor becomes large-sized unnecessarily.

Therefore, if the outer-rotor is also used as a flywheel of an engine concurrently, it is inevitable that a pole of a multipolar electricity generating section on the inner side of the outer-rotor is used for ignition exclusively to extract electricity for an ignition device, as shown in Japanese Utility Model Publication Hei 6-46219. As a result, the ignition device itself becomes complicated and high-priced, and a part of the output of the multipolar electricity generating section, which is capable of generating high output by nature, is sacrificed to use it for ignition.

SUMMARY OF THE INVENTION

The present invention has been accomplished in view of the forgoing and one object of the invention is to provide an outer-rotor type engine-operated generator of low cost and simple construction which can be miniaturized in its entirety and can leak electricity for ignition without sacrificing a part of the generated electric output.

In order to attain the above object, the present invention provides an outer-rotor type engine-operated generator having a plurality of magnets arranged along an inner circumference of an outer cylindrical wall of an outer-rotor and a multipolar stator housed within the outer-rotor facing the magnets, the generator comprising an electricity generating section for an engine ignition device disposed outside of and opposite to the outer cylindrical wall of the outer-rotor; and a through window formed in a part of the outer cylindrical wall through which magnetic force of the magnets affects the electricity generating section.

By this simple construction in which a through window for letting through magnetic force is provided in a part of the outer-rotor, the magnetic force of the magnets arranged on the inner circumference of the outer cylindrical wall of the outer-rotor is led to the outside through the through window and source electricity for ignition can be extracted from the electricity generating section for the engine ignition device disposed on an outside of and opposite to the outer cylindrical wall.

Thus the multipolar electricity generating section can maintain a high electric output without sacrificing a part thereof.

In addition to that the outer-rotor can also be used as a flywheel concurrently, it is unnecessary to provide a separate, dedicated magnet for generating ignition energy on a circumference of the outer cylindrical wall, and the through window has only to be provided in a part of the outer cylindrical wall so that the outer-rotor is not made large-sized in miniaturizing the entire engine-operated generator.

In the above outer-rotor type engine-operated generator, the through window may be constituted by a plurality of slits.

A necessary ignition energy can be obtained by the simple construction with a plurality of slits provided in a part of the outer cylindrical wall. The slits forming the through window are so slender as not to influence support of the magnets and, therefore, a sufficient magnet supporting strength for opposing the centrifugal force occurring at a high rotational speed of the outer rotor can be maintained.

In another aspect of the present invention, there is provided an outer-rotor type engine-operated generator as mentioned above, wherein each of the magnets is polarized into an outer circumferential side and an inner circumferential side, polarities of neighboring magnets are opposed to each other, and one of the slits is positioned to correspond with opposite sides of a pair of neighboring magnets.

Magnetic force produced between the opposite sides of the neighboring magnets enters and leaves the one of the slits to leak out so that ignition voltage can be leaked out from the electricity generating section for an engine ignition device. Since each magnet corresponds with the slit at a side of the magnet, a sufficient supporting strength of the magnet can be ensured.

According to the other aspect of the present invention, there is provided an outer-rotor type engine-operated generator as mentioned above, wherein each of the magnets is polarized into an outer circumferential side and an inner circumferential side, polarities of neighboring magnets are opposed to each other, and the slits are disposed with respect to the magnets so that magnetic force generated between a pair of neighboring magnets emerges from one of the slits and enters another slit.

Since the magnetic force emerges from one of the slits and enters another slit, the magnetic force leaking out affects the electricity generating section for an engine ignition device effectively so that a sufficient source electricity for ignition can be extracted by the electricity generating section. Since the slits correspond with the magnets partly, the supporting strength of the magnet can be ensured sufficiently.

In any one of the above-mentioned outer-rotor type engine-operated generators, the electricity generating section for an engine ignition device may be constituted by a self-trigger type ignition apparatus.

Since the self-trigger type ignition apparatus requires no signal system for ignition timing, the construction is simplified and the cost is lowered.

DETAILED DESCRIPTION OF THE PREFERRED EMBODIMENT

Hereinafter, a preferred embodiment of the present invention will be described with reference to FIGS. 1 to 5.

Figure 1:
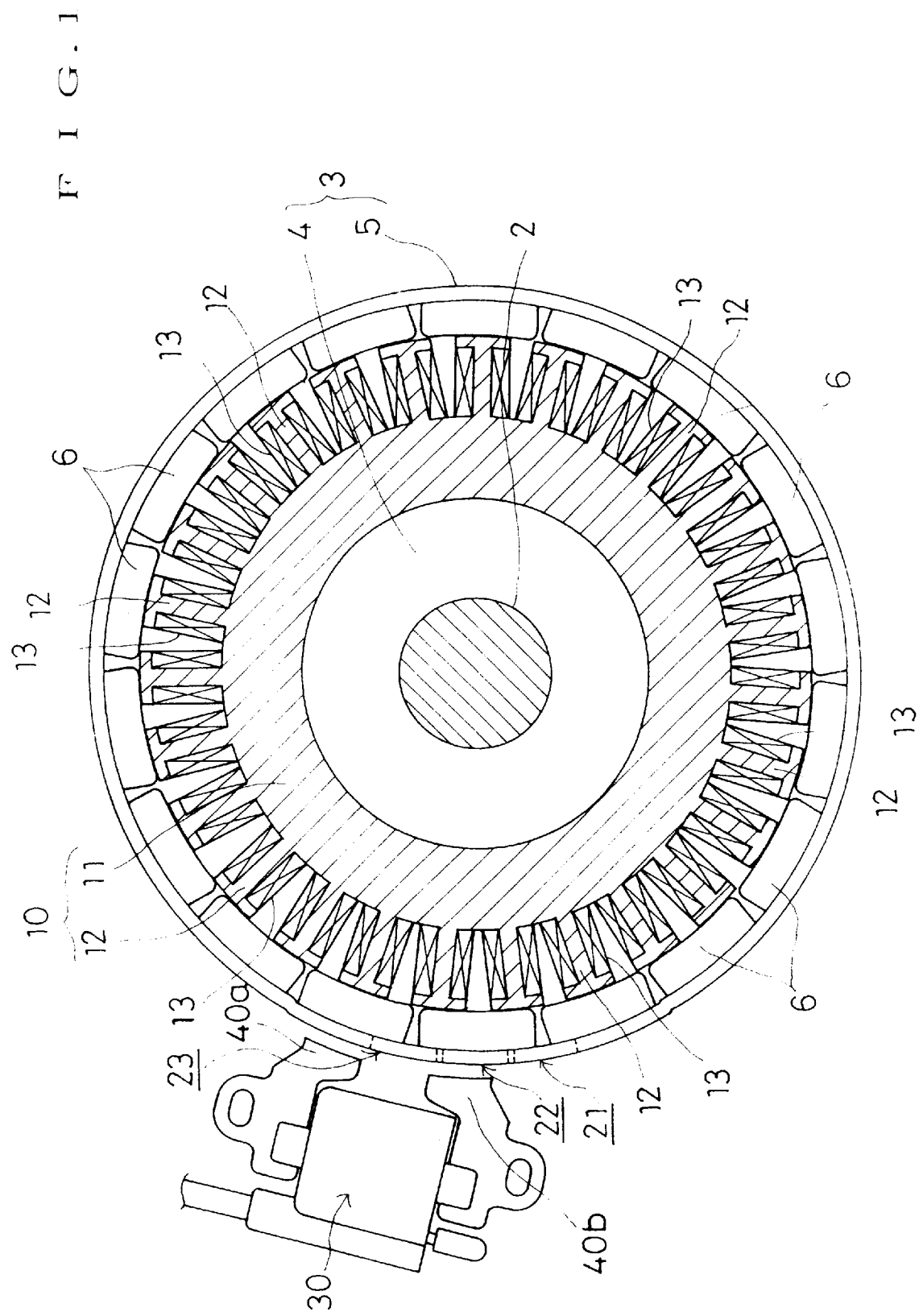
FIG. 1 is a section of an essential part of an outer-rotor type engine-operated generator according to an embodiment of the present invention.

FIG. 1 is a sectional view showing a construction of an essential part of an outer-rotor type engine-operated generator 1 according to the embodiment.

A flywheel rotor 3 combining an outer rotor with a flywheel is formed in a circular bowl-like shape with a disk-like bottom wall 4 and an outer cylindrical wall 5. The bottom wall 4 is fitted to a driving shaft 2 so that the flywheel rotor 3 is supported so as to rotate together with the driving shaft 2.

On an inner peripheral surface of the outer cylindrical wall 5 are arranged eighteen pieces of magnet 6 in a circumferential direction. The magnet 6 is polarized so as to have an outer circumferential side of N pole and an inner circumferential side of S pole or an outer circumferential side of S pole and an inner circumferential side of N pole, and polarities of neighboring magnets 6, 6 are opposed to each other.

In an inner space surrounded by the annularly arranged magnets 6 is housed a stator 10 which has a stator core 11 fixedly supported by a sleeve at the center and twenty-seven pieces of pole 12 radially projected on an outer periphery of the stator core. Electricity generating coils 13 are wound around the poles 12. The poles 12 are opposite to the magnets 6 through minute gaps.

Figure 2:
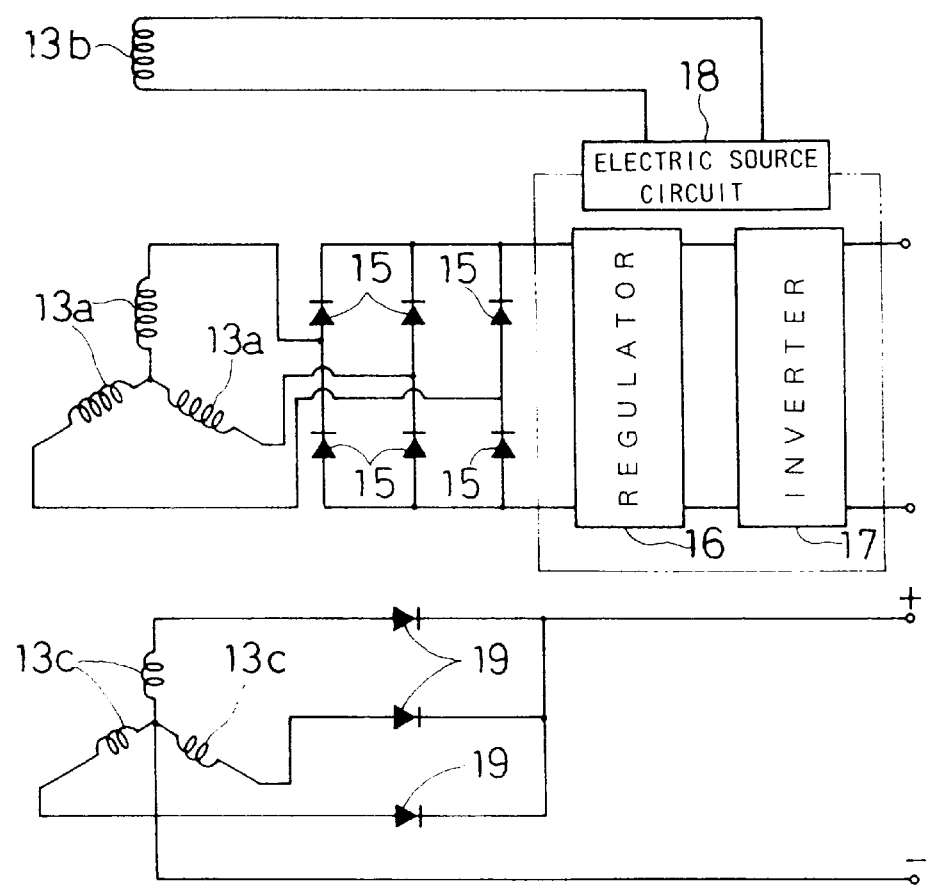
FIG. 2 is a diagram showing an electricity generating circuit of the outer rotor type engine-operated generator.

FIG. 2 is a circuit diagram showing an electricity generating circuit of the generator. The circuit has three kinds of electricity generating coils 13. Among these electricity generating coils, a 3-phase electricity generating coil 13a is connected with a regulator 16 through a 3-phase full-wave rectifier circuit comprising six diodes 15. The regulator 16 is connected with an inverter 17 from which an alternating current output of commercial frequency (50 Hz or 60 Hz for example) is obtained.

A single phase electricity generating coil 13b, which is another kind of the electricity generating coil 13, is connected with an electric source circuit 18 for driving the regulator 16 and the inverter 17.

A remaining 3-phase electricity generating coil 13c is connected with a 3-phase half-wave rectifier circuit comprising three diodes 19 from which a direct current output for battery charging, for example, is obtained.

Figure 3:
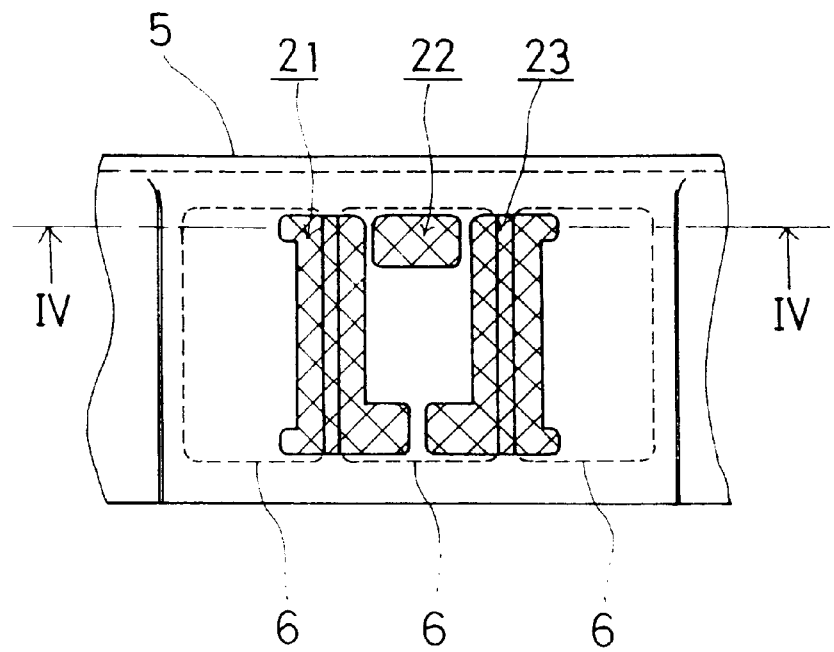
FIG. 3 is a side view showing a part of a flywheel rotor.
Figure 4:
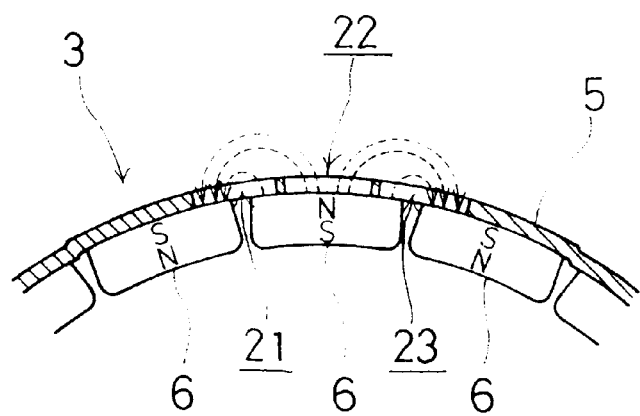
FIG. 4 is a section taken along the line IV—IV of FIG. 3.

According to the present embodiment, in the above-mentioned outer-rotor type engine-operated generator 1, three slits 21, 22 and 23 (hatched portions of FIG. 3) are formed in a part of the outer cylindrical wall 5 of the flywheel rotor 3 in which three neighboring ones of the magnets 6 are disposed as shown in FIGS. 3 and 4. And a self-trigger type ignition apparatus 30 is disposed at the exterior of the outer cylindrical wall 5 being opposite to the wall (FIG. 1).

As shown in FIG. 3, each of the right and left slits 21, 23 is long in the axial direction and shaped like the letter "L". Respective end portions of the slits 21, 23 extend so as to approach to each other, that is, the slits 21, 23 are symmetrical with each other. Each slit 21, 23 is formed in a position where opposite sides of a pair of the neighboring magnets of the interior can be seen from the exterior through the slit. The length of the slits 21, 23 in the axial direction is somewhat shorter than that of the magnets 6.

The other slit 22 disposed between the slits 21, 23 is positioned apart in the axial direction from the extending end portions of the slits 21, 23. The slit 22 is rectangular, longer in the circumferential direction and formed above an outer circumferential portion of a middle one of the neighboring magnets.

The right and left ones of the neighboring magnets 6, 6 are supported by the outer cylindrical wall 5 such that an outer surface thereof fill engages the outer cylindrical wall 5 with only the exception of respective portions corresponding with the slits 21, 23 and exposed therethrough. The middle magenet 6 is supported by the outer cylindrical wall 5 such that an outer surface thereof fully engages the outer cylindrical wall 5 with the exception of both side portions and a part of the middle corresponding with the slits 21, 22, 23. Therefore, the neighboring magnets 6 can be supported surely even if a large centrifugal force acts on the magnets at a high rotational speed.

FIG. 4 is a section taken along the line IV—IV of FIG. 3 passing through the slit 22 at a right angle with the axial direction. As shown in FIG. 4, magnetic fluxes emerging from a middle portion of the N pole at the outer circumferential side of the middle magnet 6 leak out through the slit 22 and reach the S pole at the outer circumferential sides of the right and left one of the neighboring magnets 6, 6 through the right and left slits 21, 23.

Magnetic fluxes emerging from right and left side portions of the N pole at the outer circumferential side of the middle magnet 6 leak out through the right and left slits 21, 23 and reach the S pole at the outer circumferential sides of the right and left ones of the neighboring magnets 6,6 through the same slits 21, 23.

When the flywheel rotor 3 rotates, the above-mentioned flux leaking out also rotates together with the rotor 3 and in every time that the flux passes through the self-trigger type ignition apparatus 30 disposed on the outside of the outer cylindrical wall 5, an engine ignition action is carried out by the ignition apparatus 30. The self-trigger type ignition apparatus has an igniter 31 facing the outer circumferential surface of the outer cylindrical wall 5.

Figure 5:
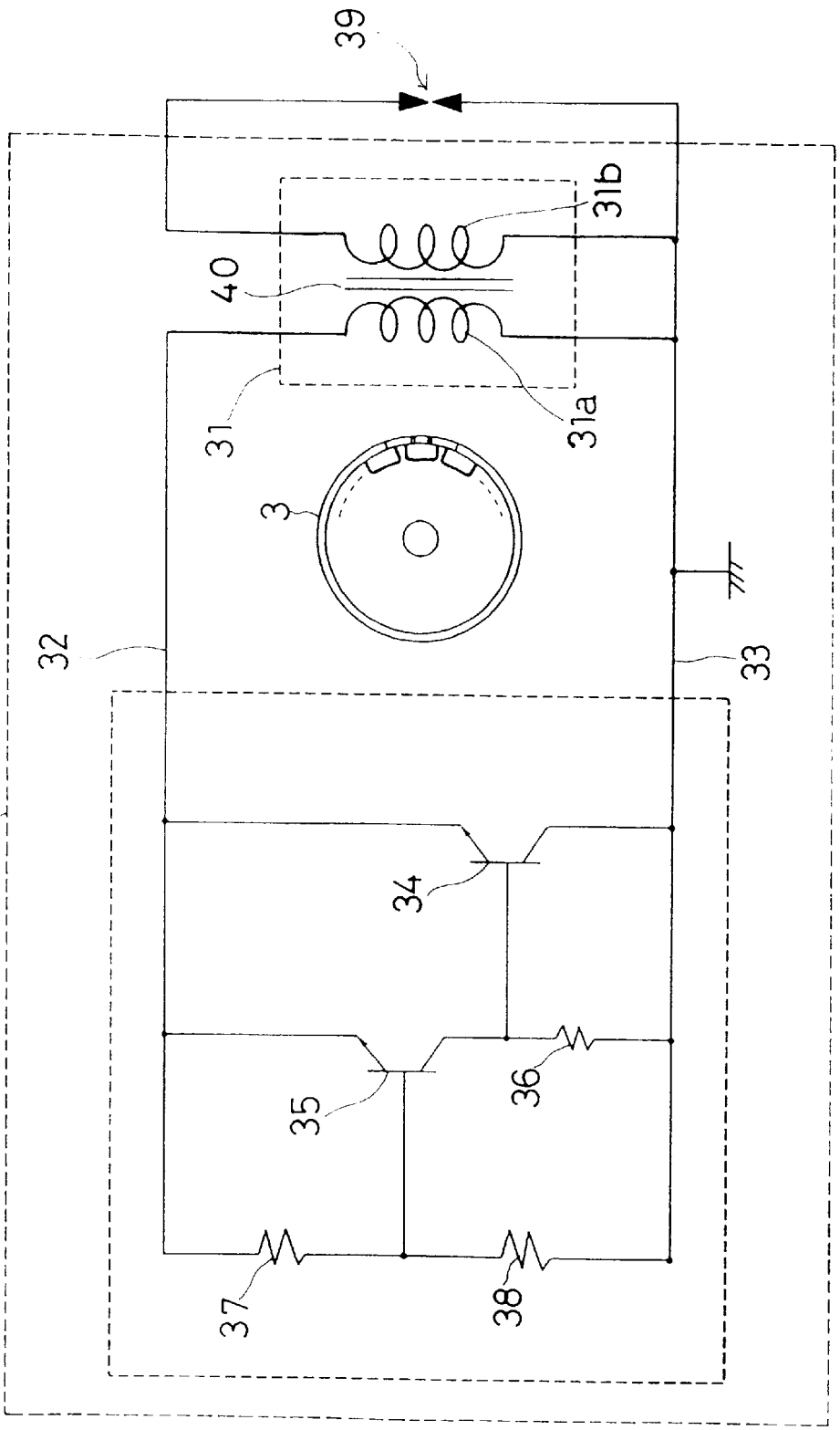
FIG. 5 is a diagram showing a circuit of a self-trigger type ignition apparatus.
Figure 1:
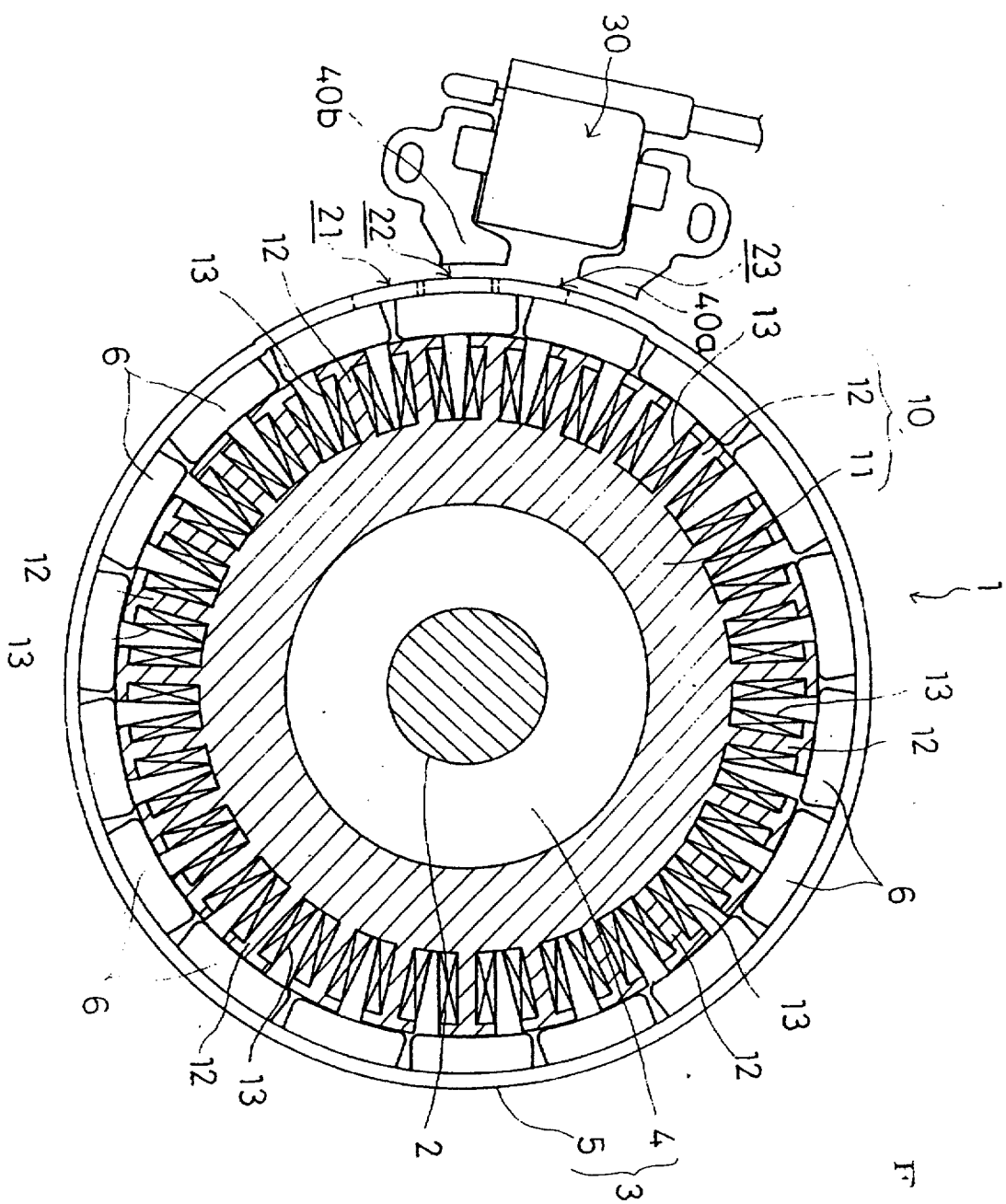

As shown in FIGS. 1 and 5, the igniter 31 comprises a U-shaped iron core 40 having a pair of leg portions 40a, 40b, and both primary and secondary coils 31a, 31b. As shown in FIG. 1, the dimension between inner sides of the leg portions 40a, 40b is smaller than the circumferential dimension of the magnet 6, and the dimension between outer sides of the leg portions 40a, 40b is larger than the circumferential dimension of the magnet 6.

A circuit constitution of the self-trigger type ignition apparatus 30 having the above-mentioned igniter 31 is shown in FIG. 5. Both ends of the primary coil 31a of the igniter 31 are connected with electric lines 32, 33 respectively. The electric line 32 is connected with emitters of transistors 34, 35 and the electric line 33 is grounded. A collector of the transistor 34 and a resistance 36 connected with a collector of the transistor 35 are connected with the grounded electric line 33.

The base of the transistor 34 is connected with the collector of the transistor 35 and the base of the transistor 35 is connected to a connecting portion between resistances 37 and 38 which are arranged between the electric lines 32 and 33 in series.

On the one hand, an end of the secondary coil 31b of the igniter 31 is connected with an end of an ignition plug 39. Another end of the secondary coil 31b is connected with another end of the ignition plug 39 and grounded.

When the flywheel rotor 3 rotates and the magnetic flux leaking section, or through window constituted by the slits 21, 22, 23 reaches the leg portion 40a on one side of the iron core 41 of the igniter 31, voltage is generated in the primary coil 31a of the igniter 31, the emitter side of the transistor 34 becomes a state of positive voltage and both transistors 34, 35 do not operate. Next, when the magnetic flux leaking section approaches the other leg portion 40b of the iron core, the direction of the magnetic flux flowing in the U-shaped iron core 40 is reversed to generate voltage of opposite direction, and thus the collector side of the transistor 34 becomes a state of positive voltage to make the transistor 34 conductive and primary electric current flows in the primary coil 31a.

As the magnetic flux leaking section approaches the leg portion 40b, collector voltage of the transistor 34 rises gradually and when base voltage of the transistor 35 divided by the resistances 37, 38 reaches a trigger voltage, the transistor 35 becomes conductive, the transistor 34 becomes off and the primary coil 31a of the igniter 31 is cut off in a moment. As the result, a high voltage pulse is induced in the secondary coil 31b of the igniter 31 to generate a spark at the ignition plug 39.

The above-mentioned outer-rotor type engine-operated generator 1 is miniaturized by using the flywheel rotor 3 which combines an outer-rotor and a flywheel. In the generator 1, by the simple construction that slits 21, 22, 23 for leaking out magnetic force are provided in a part of the flywheel rotor 3, magnetic force of the magnets 6 arranged on the inner circumference of the outer cylindrical wall 5 of the flywheel rotor 3 is led outside through the slits 21, 22, 23 and source electricity for ignition is extracted by the igniter 31 of the self-trigger type ignition apparatus 30 disposed at the exterior of the outer cylindrical wall 5 facing it. Thus, the ignition plug 39 sparks once every rotation of the flywheel rotor 3.

The number of slits provided in the outer cylindrical wall 5 for letting the magnetic force pass are formed in a minimum area of the outer cylindrical wall so that the slits never hinder a proper support of the magnets 6 on the inner circumference of the outer cylindrical wall 5. Even if a large centrifugal force acts on the magnets 6 due to a high rotational speed, sufficient supporting strength can be ensured according to the invention.

According to the invention, as described above, a small number of the magnets 6 for generator output are also utilized for ignition, but ignition energy is obtained from an electricity generating section for ignition additionally provided outside the flywheel rotor. Therefore, any part of the electric energy available as electric source of the generator is not sacrificed for ignition and a high generator output can be obtained efficiently.

Although there has been described what is at present considered to be the preferred embodiment of the invention, it will be understood by persons skilled in the art that variations and modifications may be made thereto without departing from the gist, spirit or essence of the invention. The scope of the invention is indicated by the appended claims, rather than by the foregoing description of the presently preferred embodiment.

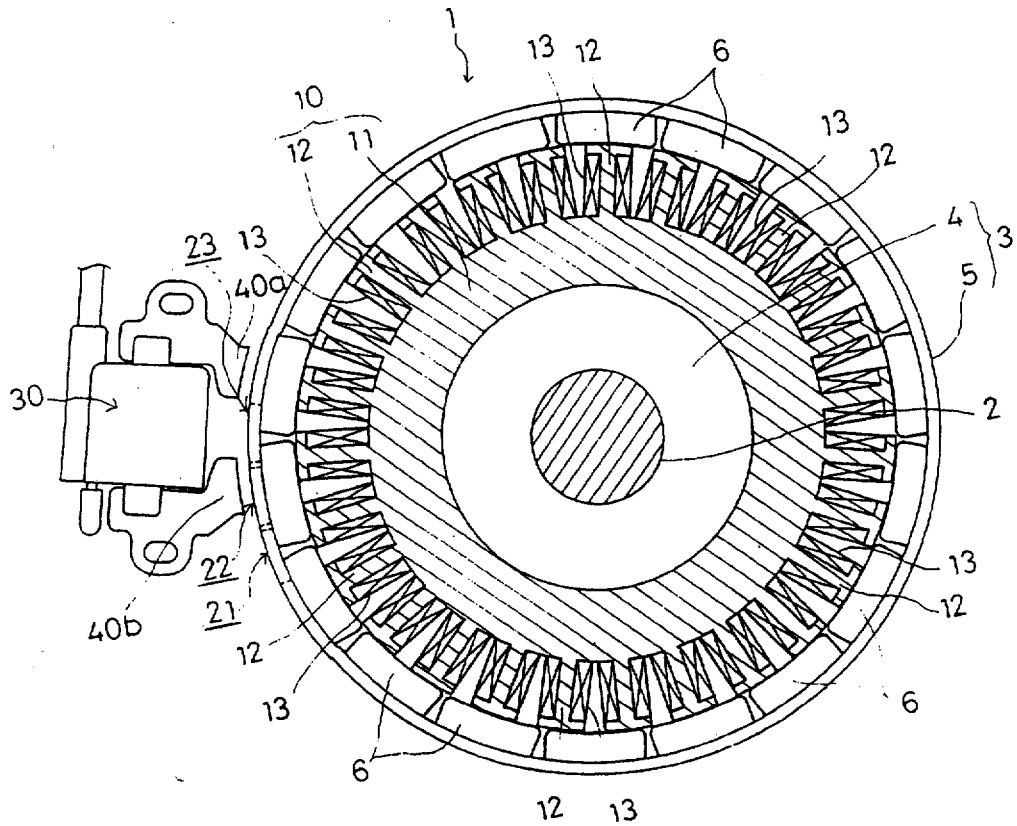

We claim:

1. An outer-rotor engine-operated generator having a plurality of magnets arranged along an inner circumference of an outer cylindrical wall of an outer-rotor and a multipolar stator housed within the outer-rotor facing the magnets, comprising:

an electricity generating section for an engine ignition device, disposed outside of and opposite to said outer cylindrical wall of said outer-rotor; and a through window formed in a part of said outer cylindrical wall through which magnetic force of said magnets affects said electricity generating section;

said through window comprising a plurality of slits defined in said part of the outer cylindrical wall; and each of said magnets being polarized into an outer circumferential side and an inner circumferential side, polarities of neighboring ones of said magnets are opposed to each other, and one of said slits being positioned to correspond with opposed sides of a pair of the neighboring magnets.

2. An outer-rotor engine-operated generator as claimed in claim 1, wherein said slits are disposed with respect to said magnets so that magnetic force generated between said pair of neighboring magnets emerges from one of said slits and enters another said slit.

3. An outer-rotor engine-operated generator as claimed in claim 1, wherein said electricity generating section for an engine ignition device comprises a self-trigger ignition apparatus.

4. An outer-rotor engine-operated generator as claimed in claim 1, wherein said through window permits the magnetic force of said magnets to leak through the part of said outer cylindrical wall near said electricity generating section.

5. An outer-rotor engine-operated generator as claimed in claim 1, wherein each of said slits has a surface area which is smaller than a surface area of an outer surface of each of said magnets.

6. An outer-rotor engine-operated generator as claimed in claim 1, wherein said electricity generating section for an engine ignition device has a substantially U-shaped core with leg portions thereof facing said outer cylindrical wall of said outer-rotor, a dimension between inner sides of the leg portions is smaller than a circumferential dimension of each said magnet, and a dimension between outer sides of the leg portions is larger than the circumferential dimension of each said magnet.

7. An outer-rotor engine-operated generator as claimed in claim 1, wherein electricity generated by said electricity generating section is used by the engine ignition device to create a spark.

8. An outer-rotor engine-operated generator as claimed in claim 1, wherein said slits are open.

9. An outer-rotor engine-operated generator as claimed in claim 1, wherein neighboring ones of said magnets are separated by space therebetween.

10. An outer-rotor engine-operated generator comprising:
an outer-rotor;
a plurality of magnets arranged along an inner circumference of an outer cylindrical wall of said outer-rotor;
a multipolar stator housed within the outer-rotor facing the magnets;
an electricity generating means for an engine ignition device, disposed outside of and opposite to said outer cylindrical wall of said outer-rotor; and
magnetic force leaking means for leaking magnetic force of said magnets to said electricity generating means;

said magnetic force leaking means comprising a plurality of slits defined in a part of said outer cylindrical wall; and each of said magnets being polarized into an outer circumferential side and an inner circumferential side, polarities of neighboring ones of said magnets are opposed to each other, and said magnetic force leaking means being positioned to correspond with opposed sides of a pair of the neighboring magnets.

11. An outer-rotor engine-operated generator as claimed in claim 10, wherein said slits are disposed with respect to said magnets so that magnetic force generated between a pair of said neighboring ones of said magnets emerges from one of the slits and enters another said slit.

12. An outer-rotor engine-operated generator as claimed in claim 10, wherein said electricity generating means for an engine ignition device comprises a self-trigger ignition apparatus.

13. An outer-rotor engine-operated generator as claimed in claim 10, wherein electricity generated by said electricity generating means is used by the engine ignition device to create a spark.

14. An outer-rotor engine-operated generator as claimed in claim 10, wherein said slits are open.

15. An outer-rotor engine-operated generator as claimed in claim 10, wherein neighboring ones of said magnets are separated by space therebetween.

* * * * *

UNITED STATES PATENT AND TRADEMARK OFFICE
CERTIFICATE OF CORRECTION

| | | |
|---|---|---|
| PATENT | : 5,962,939 | |
| DATED | : October 5, 1999 | |
| INVENTOR(S) | : Masashi Nakamura, Motohiro Shimizu, Tadafumi Hirose | |

It is certified that error appears in the above-identified patent and that said Letters Patent is hereby corrected as shown below:

The title page showing the illustrative figure should be deleted to be replaced with the attached title page.

In the drawings, Sheet 1 of 1, consisting of Fig. 1, should be deleted and substitute therefor Sheet 1 of 1, consisting of Fig. 1, as shown on the attached page.

Column 3, line numbered between 48 and 49, change "coil 13" to --coils 13--.

Column 4, 12th line, after "magnets" insert --6--.
        18th line, change "magenet" to --magnet--.

Column 5, 6th line, after "window" insert a comma.

Signed and Sealed this

Eighteenth Day of July, 2000

*Attest:*

Q. TODD DICKINSON

*Attesting Officer*      *Director of Patents and Trademarks*

United States Patent
Nakamura et al.

[11] Patent Number: 5,962,939
[45] Date of Patent: Oct. 5, 1999

[54] OUTER-ROTOR TYPE ENGINE-OPERATED GENERATOR

[75] Inventors: Masashi Nakamura; Motohiro Shimizu; Tadafumi Hirose, all of Wako, Japan

[73] Assignee: Honda Giken Kogyo Kabushiki Kaisha, Tokyo, Japan

[21] Appl. No.: 09/010,105

[22] Filed: Jan. 21, 1998

[30] Foreign Application Priority Data

Jan. 22, 1997 [JP] Japan .................. 9-009309

[51] Int. Cl.$^6$ .................. H02K 11/00; H02K 7/02; H02K 21/22; F02P 1/00
[52] U.S. Cl. .................. 310/70 A; 310/74; 310/153; 310/156; 310/267; 123/149 D
[58] Field of Search .................. 310/70 A, 74, 310/153, 156, 70 R, 68 B, 261, 267; 74/572; 318/830; 324/146; 336/210–213, 216–219, 233; 123/149 D, 149 A

[56] References Cited

U.S. PATENT DOCUMENTS

| | | | |
|---|---|---|---|
| 3,828,212 | 8/1974 | Harkness et al. | 310/153 |
| 4,146,806 | 3/1979 | Katsumata | 310/153 |
| 4,435,660 | 3/1984 | Willer et al. | 310/153 |
| 4,603,664 | 8/1986 | Jackson | 123/149 D |
| 4,606,323 | 8/1986 | Nash | 123/602 |
| 5,654,600 | 8/1997 | Nomura et al. | 310/68 B |

FOREIGN PATENT DOCUMENTS

| | | |
|---|---|---|
| 61-40463 | 2/1986 | Japan . |
| 646219 | 11/1994 | Japan . |

*Primary Examiner*—Thomas M. Dougherty
*Assistant Examiner*—Dang Dinh Le
*Attorney, Agent, or Firm*—Carrier, Blackman & Associates, P.C.; Joseph P. Carrier; William D. Blackman

[57] ABSTRACT

An outer-rotor type engine-operated generator is of low cost and simple construction, can be miniaturized and can leak electricity for ignition without sacrificing generator output. The engine-operated generator has a plurality of magnets arranged along an inner circumference of an outer cylindrical wall of an outer-rotor and a multipolar stator housed within the outer-rotor facing the magnets. An electricity generating section for an engine ignition device is disposed on an outside of and opposite to the outer cylindrical wall of the outer-rotor, and a through window, through which magnetic force of the magnets affects the electricity generating section, is formed in a part of the outer cylindrical wall.

15 Claims, 4 Drawing Sheets